W. D. ARNETT.
Car-Axle Box.
No. 14,981.  Patented May 27, 1856.
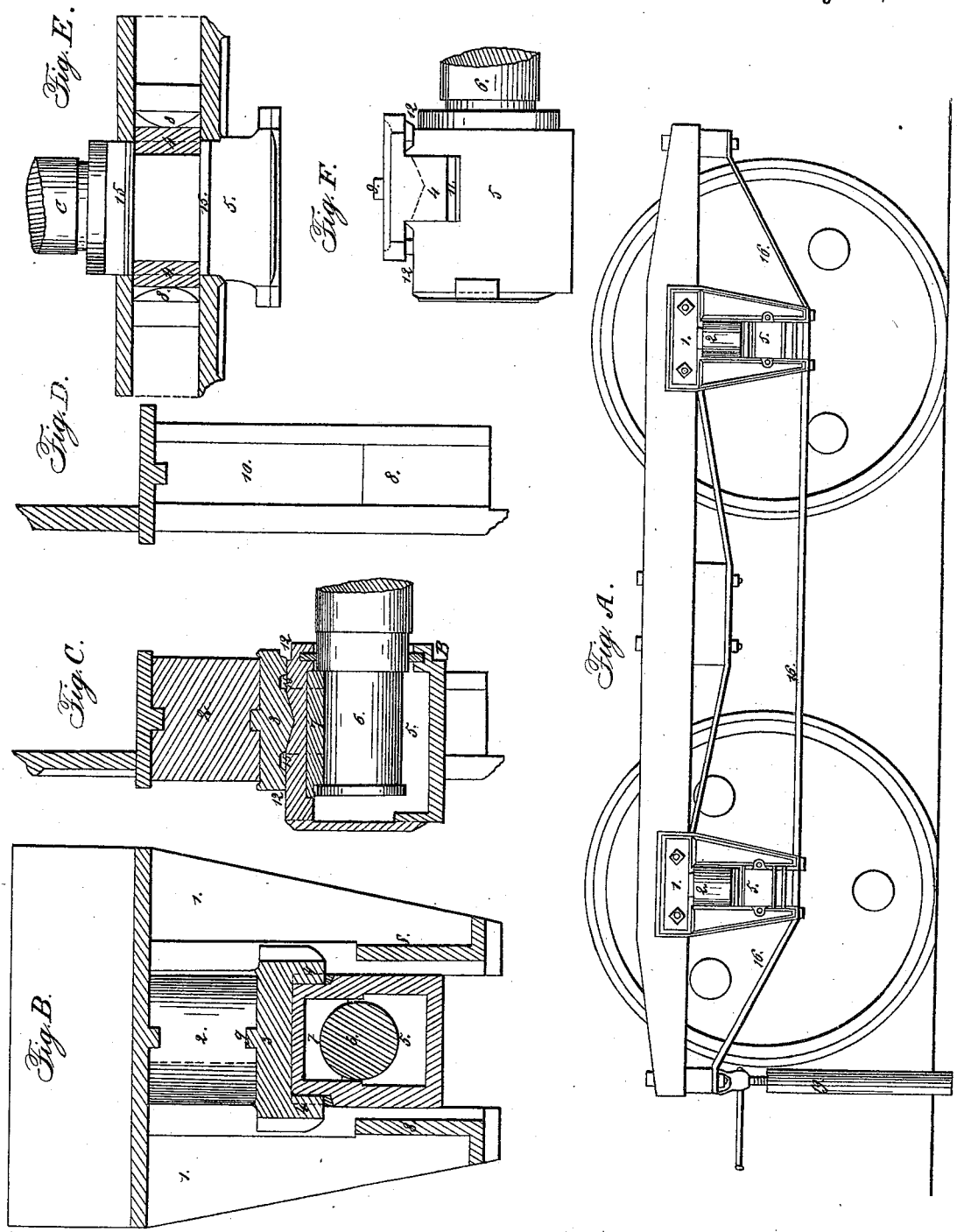

UNITED STATES PATENT OFFICE.

WM. D. ARNETT, OF CINCINNATI, OHIO.

REPLACEABLE AXLE-BOX FOR RAILROAD-CARS.

Specification of Letters Patent No. 14,981, dated May 27, 1856.

*To all whom it may concern:*

Be it known that I, WILLIAM D. ARNETT, of the city of Cincinnati, in the county of Hamilton and State of Ohio, have invented a new and useful Improvement in Car-Axle-Box Cases for Disconnecting Them from the Pedestals or Jaws; and I do hereby declare that the following is a full and exact description thereof, reference being had to the accompanying drawings, forming part of this specification, and to the letters and figures of reference marked thereon.

Similar figures refer to corresponding parts.

Heretofore when it has been necessary to take the box-case out of the pedestals or jaws attached to the truck of the car it required the stay-bars attached to the lower part of the depestal to be detached and removed, and the truck to be elevated by a jack-screw or otherwise until the lower part of the pedestal is raised above the top of the box-case, a process requiring much hard labor, loss of time and inconvenience, all of which I avoid by the application of my improvement, which consists in the manner of constructing the box-case, together with the flange on which the lower part of the rubber spring is made to rest, so that when it becomes necessary to remove the box-case from the pedestal all that is required is to elevate the truck about an inch and a half, or less, which loosens the rubber spring sufficient to take it out, after which the rubber-flange (as denominated) over the box-case is elevated, thus leaving the box-case free to be removed out at the front of the pedestal, instead of employing the tedious process before alluded to. The said rubber flange has two lock lugs, one on each side, that project down into recesses made in the box-case on each of its sides at the top for keeping and holding the box-case in its position.

The advantages of my improvement will be readily seen, as it is often necessary to remove the box-case from the pedestal in order to get an opportunity to fit new boxes to the axle, which must be frequently done owing to the irregular wearing of the axle.

To enable others skilled in the art to make and use my improvement, I will proceed to describe its construction and operation by referring to the accompanying drawings and figures of reference marked thereon.

Figure A, represents a side elevation of a truck for illustrating the advantages of the improvement. Fig. B, is a longitudinal sectional elevation through the pedestal, rubber spring, flange, and box-case. Fig. C, is a transverse sectional elevation of the pedestal, rubber-spring, flange and box-case. Fig. D, represents a transverse sectional view of the pedestal detached from its other parts. Fig. E, gives a horizontal sectional view of the pedestal showing the top of the box-case. Fig. F is a side elevation of the box-case and rubber flange drawn separate.

1, 1, represent the pedestal, 2 the rubber spring, 3 the rubber flange which is provided with a stud or axes pin 9, projecting up from the center of the flange, as shown in the different drawings, and a similar stud projects down from the horizontal flange of the pedestal, for the purpose of holding the rubber spring to its place by having the said studs to pass into recesses made in the center of the rubber spring, as represented.

4, 4, are locking lugs attached to, and projecting down from each side of the rubber flange 3, part of which lugs pass into recesses 11, 11, made on each side of the box-case 5, as represented in Fig. B, and the other part of the lug passes between the front and back flanges forming the pedestal, which prevents them from working laterally.

10 in Fig. D represents the opening formed by the flanges, and 8 the connecting flange at the lower part of the pedestal.

In Fig. E, the locking lugs 4, 4, are fully represented in connection with the box-case, showing how the box-case is held to the pedestal to prevent its moving horizontally or sidewise.

7 in Fig. B is supposed to be the box against which the axle 6 works. The rear end of the axle is furnished with leather packing 13, to prevent the loss of oil.

12, 12, represent bearing pieces cast to the under part of the rubber flange at its front and back part, and are made to rest on the top of the box case 5.

The top of the box-case is provided with an angular concave, as shown in Fig. C, and a flange or lug 15, 15 on each side of it, and the rubber flange on its under part is furnished with a projection similar in form to the angular recess on the top of the box-case, and fits therein, serving to hold it more firmly to its place.

The operation of the improvement is as follows: When it is required to take the box-case out of the pedestal, a jack-screw 14 or other similar contrivance is placed under the end of the truck, as represented in Fig. A, and the truck is elevated sufficient to loosen the rubber spring 2, an inch and a half or less being enough. The rubber is then removed, and the rubber flange raised up, which frees the locking lugs 4, from the recesses 11, made in the sides of the box-case, after which the box-case can be taken out at the front of the pedestals or jaws, thus avoiding the time, trouble, and expense attending the old method of elevating the truck and taking the box-case out at the lower part of the pedestal and detaching the stay-bar.

I am aware that boxes have been made so that the bearings and other parts can be taken out separately, without removing the stay-bar. This therefore I do not claim; but What I do claim as my invention and desire to secure by Letters Patent, is—

The arrangement as above described by which the entire case can be removed, with the inclosed oil-box and bearings, said box or case being slid into place and attached to the piece upon which the spring rests by means of the lugs 4 and recess 11, substantially as above described.

WILLIAM D. ARNETT.

Witnesses:
MARTIN BENSON,
I. N. KINNEY.